Patented Nov. 22, 1949

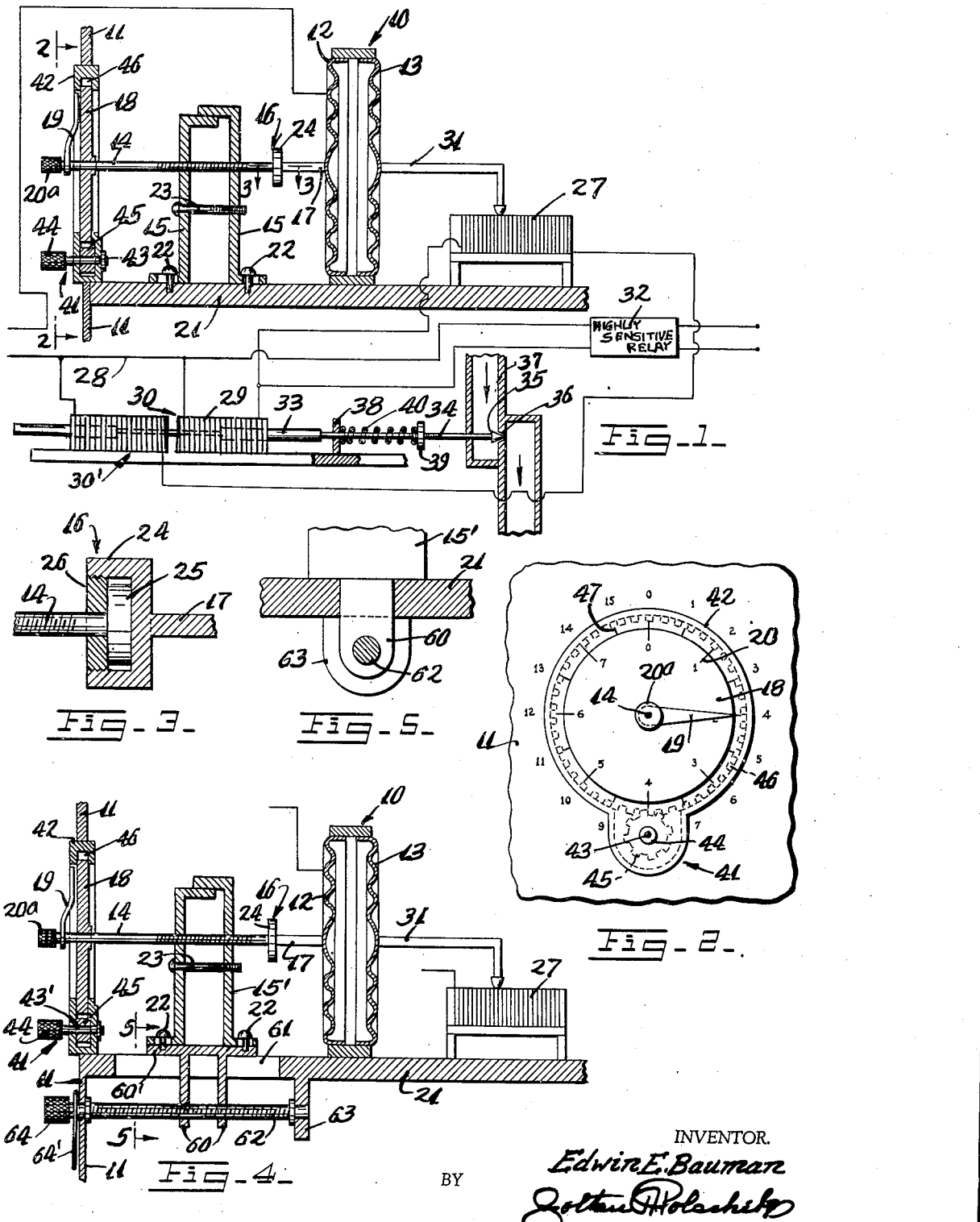

2,489,073

UNITED STATES PATENT OFFICE 2,489,073

ANEROID, INCLUDING LOADING MECHANISM THEREFOR

Edwin E. Bauman, River Edge, N. J.

Application November 19, 1943, Serial No. 510,905

6 Claims. (Cl. 137—156)

This invention relates to an aneroid having a new and useful mechanism for loading the cell thereof.

More specifically, the invention relates to an aneroid having improved mechanism for loading the cell thereof which may be employed on aircraft in conjunction with the control of the fuel line to the motors, with the throttle of the motors, or with the pitch control of the propellers in a manner to cause these devices, depending upon which one of the controls the aneroid is to be connected with, to be set to raise the aircraft to a desired elevation and level the craft off and maintain it at the desired elevation.

Still further it is proposed to provide a hermetically sealed cell containing a pressure sensitive expendable gas having a selector diaphragm adapted to be manually set and a reaction diaphragm arranged to be acted upon by air pressure external of the cell in a manner to enable it to be employed to set means designed to provide the required lift for moving an aircraft to the desired elevation.

A further object of the invention proposes the construction of a novel means permitting the selector diaphragm of the sealed cell to be manually adjusted and which may be arranged upon the dashboard of the aircraft to be easily accessible to the pilot of an aircraft.

Still another object of the invention proposes connecting the selector diaphragm and its setting mechanism together by means of a selector screw rod threadedly engaged through an adjustable pair of tension brackets to frictionally grip the selector screw rod and maintain it in adjusted positions against vibrations set up within the aircraft by the motors.

Another object of the invention proposes a novel means for adjusting the position of the tension brackets with relation to the selector diaphragm to permit the tension brackets to be shifted to pull upon the selector screw rod and adjust the position of the selector diaphragm over and above the adjustments permitted by the setting means.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a schematic illustration of the automatic altitude control for aircraft constructed in accordance with this invention.

Fig. 2 is a front elevational view of Fig. 1 looking in the direction of the line 2—2 of Fig. 1.

Fig. 3 is an enlarged sectional view of a portion of Fig. 1 taken on the line 3—3 thereof.

Fig. 4 is a view similar to a portion of Fig. 1 but illustrating a modification of the invention.

Fig. 5 is an enlarged partial vertical sectional view taken substantially on the line 5—5 of Fig. 4.

The aneroid, according to this invention, includes a hermetically sealed cell 10 arranged in position behind the dashboard 11 of the aircraft. This hermetically sealed cell 10 contains a pressure sensitive expandable gas and has a selector diaphragm 12 and a reactionary diaphragm 13 forming the wall portions thereof. Means is provided for setting the selector diaphragm to represent selected altitudes by moving the selector diaphragm 12 to expand or enlarge the chamber or cell and rarify the gas within the cell so that the reactionary diaphragm 13 will be moved by atmospheric pressure in proportion from its neutral position. This means comprises a selector screw rod 14 threadedly engaged intermediate of its ends through a pair of tension brackets 15. The rear end of the selector screw rod 14 is connected by means of a coupling 16 with a projecting stem 17 extending from the center of the selector diaphragm 12. The front end of the selector screw rod 14 is freely turnably or axially slidably extended through a dial plate 18 mounted on or in the dashboard 11. The exposed end of the selector screw rod 14 is provided with a radially extending selector hand or pointer 19 which is arranged to extend across a calibrated scale 20 formed on the front face of the dial plate 18. A knob 20ª is also mounted on the projected end of the selector screw rod 14 to be used for manually turning the selector screw rod 14 to adjust the position of the selector diaphragm 12.

The tension brackets 15 have their bottom ends adjustably attached to a support 21 located behind the dashboard 11 by means of pins and slots 22. The top end portions of the tension brackets 15 are extended towards each other and superimposed, slidably interfitted or telescoped upon one another. A screw 23 freely passes through an opening in one of the brackets and threadedly engages the other bracket. The screw 23 is adapted to be turned for slightly drawing the tension brackets 15 toward each other to frictionally bear against the side of the selector screw rod 14 and hold it securely in adjusted turned positions against the action of vibrations set up within the aircraft by the motors and for preventing backlash.

The coupling 16 hereinbefore referred to comprises a cup shaped member 24 formed upon the end of the shaft 17. The inner end of the selector rod 14 is provided with an enlarged head 25 which is freely rotatively extended into the open side of the cup shaped member 24 formed on the end of the shaft 17. A collar 26 is threadedly extended in or across the open side of the cup shaped member 24 and maintains the enlarged head 25 rotatively in position within the cup shaped member 24. Inasmuch as the shaft 17 is fixedly attached to the center of the selector diaphragm 12 and is unable to turn, the coupling 16 provides a swivel to rotatably connect rod 14 to the non-rotatable shaft 17 and diaphragm 12 so that the selector screw rod 14 may be manually rotated relative to shaft 17.

Means is provided controlled by movement under expansion and contraction due to the altitude and atmospheric pressure changes of the reactionary diaphragm 13 of the sealed cell 10 for controlling the lift of the aircraft. This means comprises a high resistance element 27 mounted in an electric circuit 28 including a source of power, not shown on the drawing. The electric circuit 28 also includes the winding 29 of a solenoid 30. The reactionary diaphragm 13 carries a contact arm 31 which is adapted to move across winding or coil of the resistance element 27 as the reactionary diaphragm 13 is moved in one direction or the other by the effect of external pressures to vary the resistance. This movement of the contact arm 31 increases or decreases the resistance of the element 27 and controls the supply of electric current to the winding 29 of the solenoid 30. As shown in Fig. 1, the hermetically sealed cell 10 or contact arm 31 thereof is connected in the electric circuit 28 so that the circuit will be completed through this cell 10 and the contact arm 31. Also mounted in the circuit there is a highly sensitive relay mechanism 32 provided as an auxiliary source of power for the circuit 28, if it is desired to have this circuit controlled by such a relay.

The solenoid 30 including an iron core 33 which is extended through the winding 29 and which has connected to one end thereof the stem 34 of a needle valve 35 which is adapted to close a valve opening 36 formed in the fuel line 37. The fuel line 37 is designed to supply the required fuel to the motors of the aircraft. The stem 34 of the needle valve 35 is slidably extended through a bracket 38. A collar 39 is threadedly and thus adjustably mounted on the stem 34 and an expansion spring 40 operates between the bracket 38 and the collar 39 for normally urging the needle valve 35 into a position in which it closes the valve opening 36. Movements of the contact arm 31 across the resistant element 27 to cut some of its windings out of the circuit 28 will cause greater quantities of electric current to be supplied to the winding 29 of the solenoid 30, causing the core 33 to be drawn inwards and pull upon the stem 34 of the needle valve 35, moving it into an open position with relation to the valve opening 36. This movement of the stem 34 of the needle valve 35 will be done in opposition to the pressure exerted by the adjustable expansion spring 40, and the expansion spring 40 will be free to move the needle valve 35 back to its closing position with relation to the valve opening 36 when the reactionary diaphragm 13 moves the contact arm 31 to put more of the windings of the resistance element 27 into operation in the circuit 28, reducing the supply of current to the winding 29 of the solenoid 30. Should it be desired or found that the spring 40 is not reliable enough it is suggested that it be dispensed with and in its place reliance may be had upon a second solenoid 30' opposed to solenoid 30 and having its core connected with said core 33 and controlled by a circuit connected with the back end of resistance 27.

A vernier adjustment 41 is provided for adjusting the position of the dial plate to compensate for changes in air pressure at sea level. This vernier adjustment is characterized by a frame 42 which rotatively supports the dial plate 18 in a floating position to be turnable. Adjacent one side of the dial 18 a shaft 43 is rotatively extended through the frame 42. The outer end of the shaft 43 carries a knob 44 by which it may be turned. Also mounted on the shaft 43 there is a gear 45 which meshes with complementary gear teeth 46 formed on the periphery of the dial plate 18. Rotations of the gear 45 will then cause the dial plate 18 to be rotated within the frame 42. The frame 42 is provided with a calibrated scale 47 which is adapted to be used to adjust the position of the dial plate 18, from calculations prepared by the pilot for adjusting, from the normal position shown in Fig. 2. This normal position of the dial plate is one in which the aircraft is at sea level and adjustment is made for atmospheric pressure at sea level, or the equivalent.

The operation of this invention is as follows:

To use the automatic altitude control, the dial plate 18 must first be adjusted with relation to the calibrated scale 47 from the normal position shown in Fig. 2, to adjust for the deviation of the air pressure from the normal at sea level. This is determined by calculations made by the pilot and is accomplished by turning the knob 44 of the vernier adjustment 41.

After proper corrections have been made to the position of the dial plate 18 the altitude at which the aircraft is to be flown is determined and the selector hand 19 is adjusted by turning the knob 20ª to align the hand 19 with the proper elevation figure on the calibrated scale 20 of the dial 18. This will turn the selector screw rod 14 relative to the brackets 15 and pull outwards upon the selector diaphragm 12. This will rarify the sensitive expandable gas within the hermetically sealed cell 10 so that the pressure of the air at sea level or on the ground will immediately move the reactionary diaphragm 13 inwards until the pressure within the hermetically sealed cell 10 becomes equal to the pressure externally of the cell. This movement of the reactionary diaphragm 13 will move the contact arm 31 across the windings of the resistance element 27 and cut several of these windings out, causing the circuit 28 to supply greater quantities of electric current to the winding 29 of the solenoid 30. This will cause the core 33 of the solenoid 30 to move inwards against the action of the spring 40. This movement will pull upon the stem 34 and move the needle valve 35 to expose the valve passage 36 and permit greater quantities of fuel to pass through the fuel line 37 to the motors or other control means.

Supplying more gasoline to the motors will immediately cause the motors to operate at greater speeds, increasing the lifting power of the aircraft and causing it to continue to rise until the aircraft reaches the elevation set upon the dial plate 18. As the aircraft rises through the air, the air externally of the sealed cell 10 will become rare, and the pressure of the expandible gas within the cell will expand and move the reactionary diaphragm 13 back to its normal position. Return movements of the reactionary diaphragm 13 will move the contact rod 31 to cause more windings of the resistance element 27 to be brought into operation in the circuit 28, cutting down the supply of electric current to the winding 29 of the solenoid 30. This will release the core 33 of the solenoid 30 so that the spring 40 will expand. Expansions of the spring 40 will move the metal valve 35 to close the valve opening 36 and cut down the supply of gasoline to the motors. This will decrease the speed of operation of the motors and cut down the lifting power of the aircraft, but will permit the motors to operate at a speed sufficient to maintain the altitude for which the device was set.

To cause the aircraft to descend, the above procedure is reversed.

In the form of the invention shown in Figs. 4 and 5, an adjustment is provided for the tension brackets 15' to permit the selector rod 14 to be adjusted to move the selector diaphragm 12 to adjusted positions over and above the adjustments provided on the selector dial 18. In this form of the invention the bottom ends of the tension brackets 15' are adjustably mounted on a slide 60' provided with downwardly extending lugs 60 which project through elongated slot 61 formed in the support 21 located behind the dashboard 11. These lugs 60 threadedly engage in a screw 62 which has its front end rotatively supported through the dashboard 11, and its rear end supported in a lug 63 extending from the support 21. The free projected end of the screw 62 is provided with a knob 64 provided with a pointer 64' for working across a calibrated scale on the dashboard 11 by which the screw 62 may be rotated to move the tension brackets 15' forward and rearward through the limits of the length of the slot 61.

Movement of the tension brackets 15' in one direction or the other will pull on the selector rod 14 to adjust the position of the selector diaphragm 12.

In other respects this form of the invention is similar to that previously shown and like reference numerals identify like parts in each of the several views.

While the preferred application of the invention has been shown on the drawings in which the altitude control is connected with the fuel line of the aircraft, it is to be understood that this is merely by way of illustration and that the device may also be connected with the elevators or throttle of the aircraft or the pitch control mechanism of the propellers for accomplishing a setting of these devices to lift and maintain the aircraft at a desired elevation.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. An aneroid comprising a hermetically sealed cell fixedly mounted on a support and having a pair of opposed diaphragm walls one of which is to be loaded, a stem projecting concentrically from the diaphragm wall to be loaded, a rod arranged in end alignment with said stem, a coupling connecting the adjacent ends of said stem and said rod so that said rod can be rotated relative to said stem, said rod being formed intermediate its ends with threads, tension brackets formed with aligned threaded openings through which the intermediate threaded portion of said rod extends, so that when said rod is rotated in one direction or the other it will move relative to said brackets and pull or push on said stem and correspondingly move the diaphragm wall to be loaded, said tension brackets being slidably mounted on the support for slight movement toward and away from each other and means for drawing said brackets together slightly to grip the threaded portion of said rod and secure it in a desired adjusted position.

2. An aneroid comprising a hermetically sealed cell fixedly mounted on a support and having a pair of opposed diaphragm walls one of which is to be loaded, a stem projecting concentrically from the diaphragm wall to be loaded, a rod arranged in end alignment with said stem, a coupling connecting the adjacent ends of said stem and said rod so that said rod can be rotated relative to said stem, said rod being formed intermediate its ends with threads, tension brackets formed with aligned threaded openings through which the intermediate threaded portion of said rod extends, so that when said rod is rotated in one direction or the other it will move relative to said brackets and pull or push on said stem and correspondingly move the diaphragm wall to be loaded, said tension brackets being slidably mounted on the support for slight movement toward and away from each other, and means for drawing said brackets together slightly to grip the threaded portion of said rod and secure it in a desired adjusted position, said slidable mounting of said tension brackets, comprising right angular foot portions formed on the bottom ends of said tension brackets and resting on the top face of the support, said foot portions being formed with elongated slots extended parallel to said rod, and pins projected through said elongated slots and mounted in the support.

3. An aneroid for loading a diaphragm wall, comprising a hermetically sealed cell fixedly mounted on a support and having a pair of opposed diaphragm walls one of which is to be loaded, a stem projecting concentrically from the diaphragm wall to be loaded, a rod arranged in end alignment with said stem, a coupling connecting the adjacent ends of said stem and said rod so that said rod can be rotated relative to said stem, said rod being formed intermediate its ends with threads, tension brackets formed with aligned threaded openings through which the intermediate threaded portion of said rod extends, so that when said rod is rotated in one direction or the other it will move relative to said brackets and pull or push on said stem and correspondingly move the diaphragm wall to be loaded, said tension brackets being slidably mounted on the support for slight movement toward and away from each other, and means for drawing said brackets together slightly to grip the threaded portion of said rod and secure it in a desired adjusted position, said drawing means comprising a screw rotatively extended through one of said tension brackets and threadedly engaging the other tension bracket.

4. An aneroid comprising a hermetically sealed cell fixedly mounted on a support and having a pair of opposed diaphragm walls one of which is to be loaded, a stem projecting concentrically from the diaphragm wall to be loaded, a rod arranged in end alignment with said stem a coupling connecting the adjacent ends of said stem and rod so that said rod can be rotated relative to said stem, said rod being formed intermediate its ends with threads, tension brackets formed with aligned threaded openings through which the intermediate threaded portion of said rod extends, so that when said rod is rotated in one direction or the other it will move relative to said brackets and pull or push on said stem and correspondingly move the diaphragm wall to be loaded, right angular foot portions formed on the bottom of said tension brackets and resting on the top face of the support, means slidably supporting said foot portions on the support, and a screw rotatively extended through one of said brackets and threadedly engaged through the other of said brackets for drawing said brackets together slightly when said screw is turned to cause said brackets to grip the threaded portion of said rod and secure it in a desired adjusted position.

5. An aneroid comprising a hermetically sealed cell fixedly mounted on a support and having a pair of opposed diaphragm walls one of which is to be loaded, a stem projecting concentrically from the diaphragm wall to be loaded, a rod arranged in end alignment with said stem, a coupling connecting the adjacent end of said stem and rod so that said rod can be rotated relative to said stem, said rod being formed intermediate its ends with threads, tension brackets formed with aligned threaded openings through which the intermediate threaded portion of said rod extends, so that when said rod is rotated in one direction or the other it will move relative to said brackets and pull or push on said stem and correspondingly move the diaphragm wall to be loaded, right angular foot portions formed on the bottom of said tension brackets and resting on the top face of the support, means slidably supporting said foot portions on the support, and a screw rotatively extended through one of said brackets and threadedly engaged through the other of said brackets for drawing said brackets together slightly when said screw is turned to cause said brackets to grip the threaded portion of said rod and secure it in a desired adjusted position, said foot portions being formed with elongated slots extended parallel to said rod, and pins passing through said elongated slots and mounted in the support forming said means slidably supporting said foot portions on the support.

6. An aneroid comprising a hermetically sealed cell fixedly mounted on a support and having a pair of opposed diaphragm walls one of which is to be loaded, a stem projecting concentrically from the diaphragm wall to be loaded, a rod arranged in end alignment with said stem, a coupling connecting the adjacent ends of said stem and said rod so that said rod can be rotated relative to said stem, said rod being formed intermediate its ends with threads, tension brackets formed with aligned threaded openings through which the intermediate threaded portion of said rod extends, so that when said rod is rotated in one direction or the other it will move relative to said brackets and pull or push on said stem and correspondingly move the diaphragm wall to be loaded, a slide for said tension brackets on the support, said tension brackets being slidably mounted on said slide for slight movement toward and away from each other, means for drawing said brackets together slightly to grip the threaded portion of said rod and secure it in a desired adjusted position, and screw operated means for moving said slide relative to the support to move said rod and said stem to load the diaphragm wall to be loaded above adjustments provided by rotation of said rod.

EDWIN E. BAUMAN.

REFERENCES CITED

The following references are of record in the file of this patent:

UNITED STATES PATENTS

| Number | Name | Date |
|---|---|---|
| 1,049,038 | Barstow et al. | Dec. 31, 1912 |
| 1,304,808 | Royce | May 27, 1919 |
| 1,586,648 | Boulade | June 1, 1926 |
| 1,766,657 | Lampton | June 24, 1930 |
| 2,112,965 | Koster | Apr. 5, 1938 |
| 2,129,613 | Wunsche et al. | Sept. 6, 1938 |
| 2,191,250 | Fischel | Feb. 20, 1940 |
| 2,225,270 | Heinrich | Dec. 17, 1940 |
| 2,316,009 | Martin | Apr. 6, 1943 |
| 2,323,311 | Crane et al. | July 6, 1943 |